No. 637,733. Patented Nov. 21, 1899.
H. C. HALL.
TOURIST'S PARCEL CARRIER.
(Application filed Jan. 6, 1899.)

(No Model.)

WITNESSES
INVENTOR
Henry C. Hall,
Per Edwin W. Brown,
Attorney.

UNITED STATES PATENT OFFICE.

HENRY C. HALL, OF CAMBRIDGE, MASSACHUSETTS.

TOURIST'S PARCEL-CARRIER.

SPECIFICATION forming part of Letters Patent No. 637,733, dated November 21, 1899.

Application filed January 6, 1899. Serial No. 701,363. (No model.)

*To all whom it may concern:*

Be it known that I, HENRY C. HALL, of Cambridge, in the county of Middlesex and State of Massachusetts, have invented certain new and useful Improvements in Tourists' Parcel-Carriers, of which the following is a full, clear, and exact description.

This invention relates to a parcel-carrier more particularly intended for use upon a bicycle and so constructed that it can be readily and conveniently attached to and detached from the handle-bar of the bicycle; and the invention consists of a parcel-carrier constructed of a plate of metal of desirable form for attachment to or detachment from the handle-bar of a bicycle or other support, in combination with one or more flexible straps, bands, or cords to which the parcel or bundle to be carried can be secured, all substantially as hereinafter fully described, reference being had to the accompanying sheet of drawings, in which is illustrated a parcel-carrier constructed in accordance with this invention as applied to the handle-bar of a bicycle.

Figure 1:
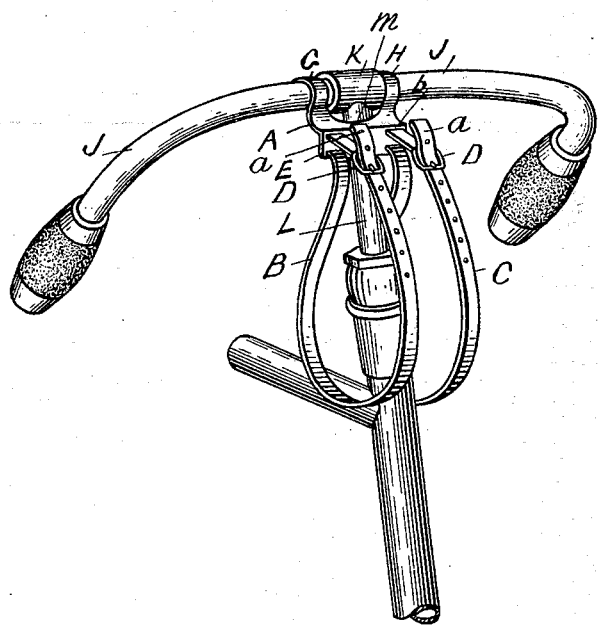
Figure 2:
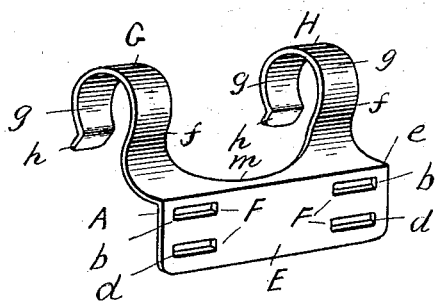

Figure 1 is a view in perspective of the parcel-carrier as attached to the handle-bar of a bicycle. Fig. 2 is a perspective view of the metal plate with the flexible straps detached.

In the drawings, A represents a metal plate bent into proper shape to be attached to a bicycle handle-bar and as having attached thereto two leather straps B C, each having at one end a buckle D, as usual in leather straps. In the straight flat portion E of the plate are four holes F, two at each end of the portion, and through each two holes are put the straps B C, respectively, the ends $a$ of the straps being first put through the upper one $b$ and back through the lower one $d$ of the holes F and pulled through sufficiently to have the buckle D close to the plate. The plate is bent substantially at right angles at $e$, and from there its central portion is cut away, as shown, making two arms G H, one at each end. These two arms are bent up or backward a little, as at $f$, and then forward and over into the arc of a circle, as at $g$, more than half the circle, their outer ends being bent backward or outward, as at $h$, by which the arms can be easily placed over the handle-bar J of a bicycle and nearly surround the same, and being of spring metal they will cling to and hold the bar, and thus the plate, in position thereon, the central edge $m$ of the plate where cut away bearing and resting against the vertical bar L, preventing the plate from turning in one direction. The spring-arms are far enough apart to be each one preferably beyond the end of the part K, which secures the handle-bar to the vertical bar.

When carrying a parcel, the straps are put around the parcel and the ends secured in the buckles in the usual way. The straps are of sufficient length to allow of various sizes of parcels within certain limits. There need be only one strap; but it is preferable to have two at least, as they hold the parcel the better to the bar, so it will not swing about. More than two straps can be used, if desired.

The plate can be easily secured to the handle-bar J by pressing its spring-arms down over the bar, which then nearly encircle it, preventing its easy detachment therefrom in the use of the bicycle, but can be removed by forcing upward the spring-arms, which, being sufficiently springy and flexible enough for such purpose, slip over the bar free of the same.

The device detached can be put in a small and compact condition by closely winding the straps around the plate, when it can be conveniently carried in one's pocket.

The straps can be made of any suitable flexible material, and the plate of any suitable metal and nickel or otherwise plated or ornamented, as desired. A greater or less number of holes for the straps can be used, as desired.

Having thus described my invention, what I claim is—

A parcel-carrier for bicycles and the like, comprising a plate bent to form a flat face having slots therein, rearwardly, upwardly and downwardly curved arms integral with said face, constituting engaging hooks adapted to be sprung over the handle-bar of the bicycle on opposite sides of the steering-post, and a web between said arms at the rear of said face adapted to bear against the steering-post for holding said face away from the machine, and securing-straps for the parcel extending through said slots.

In testimony whereof I have hereunto set my hand in the presence of two subscribing witnesses.

HENRY C. HALL.

Witnesses:
EDWIN W. BROWN,
F. B. WENTWORTH.